United States Patent [19]
An et al.

[11] Patent Number: 6,061,361
[45] Date of Patent: May 9, 2000

[54] TIME MULTIPLEXED SCHEME FOR DEADLOCK RESOLUTION IN DISTRIBUTED ARBITRATION

[75] Inventors: Jiu An, San Jose; Shashank Merchant, Sunnyvale, both of Calif.

[73] Assignee: Advanced Micro Devices, Inc., Sunnyvale, Calif.

[21] Appl. No.: 08/879,202

[22] Filed: Jun. 19, 1997

[51] Int. Cl.[7] .......................... H04L 12/43; H04L 12/40; H04J 3/02; B41B 15/00; G06F 15/00
[52] U.S. Cl. .......................... 370/462; 370/461; 370/438; 710/113; 710/128
[58] Field of Search ..................................... 370/437, 438, 370/439, 442, 444, 419, 461, 462; 340/825.5, 825.51; 710/107, 108, 109, 110, 111, 112, 113, 128, 129

[56] References Cited

U.S. PATENT DOCUMENTS

| | | | |
|---|---|---|---|
| 5,493,569 | 2/1996 | Buchholz et al. | 370/442 |
| 5,713,025 | 1/1998 | Molnar et al. | 710/107 |
| 5,787,265 | 7/1998 | Leshem | 710/107 |
| 5,797,018 | 8/1998 | Tavallaei et al. | 710/107 |

*Primary Examiner*—Hassan Kizou
*Assistant Examiner*—Hanh Nguyen

[57] ABSTRACT

An arbitration system resolves bus contention problems by assigning an exclusive portion of a clock signal to a corresponding arbiter. The system includes shared resources and one or more requesting agents that require access to more than one of the shared resources. The system uses two arbiters, each which communicate the status of a respective shared bus to the other arbiter. A first agent requesting access to a first bus is only granted access during a first portion of a clock signal and based on the availability of a second bus. A second agent requesting access to a second bus is only granted access during a second portion of the clock signal and based on an availability of the first bus.

15 Claims, 7 Drawing Sheets

TIME MULTIPLEXED SCHEME FOR DEADLOCK RESOLUTION IN DISTRIBUTED ARBITRATION

TECHNICAL FIELD

This invention relates to arbitration and more particularly to bus arbitration between a network interface and a host computer sending and receiving data to and from the network interface to avoid bus contention problems.

BACKGROUND ART

Modern computer systems often include controllers, processors, memories and peripheral devices. Data is often required to be transmitted over buses connecting these components. An example of such a system is a local area network which includes a number of network stations. The network station typically includes a Media Access Control (MAC) layer network interface that .sends and receives data to a host processor via a peripheral component interconnect (PCI) interface.

Some network interfaces include an expansion bus interface for buffering data between the PCI interface and the MAC transmit and receive FIFOs. Specifically, this interface may be used to access a shared external memory device for storing additional transmit and receive data. However, attempts to access the expansion bus interface for storage or retrieval of transmit data or receive data may occur independently. Hence, attempts to access the same resource at the same time results in bus contention problems or bus deadlock problems since two independent activities are attempting to access the same resource via the same bus.

SUMMARY OF THE INVENTION

There is a need for an arrangement that arbitrates requests for shared resources when requests for the same resource occur concurrently.

There is also a need for an arrangement that arbitrates requests for shared resources in which some of the requests require access to more than one resource.

These and other needs are attained by the present invention, where a first and second arbiter grant access requests to a first bus or a second bus during respective exclusive portions of a clock signal.

According to one aspect of the present invention, a system for arbitrating bus access requests includes a first and second arbiter. The first arbiter grants access, to a first requesting agent, to a first bus during a first portion of a clock signal and based on an availability of a second bus. The second arbiter grants access, to a second requesting agent, to a second bus during a second portion of the clock signal and based on an availability of the second bus, where the first requesting agent requires access to the first and second buses. The granting of access by the first and second arbiters during respective portions of the clock signal ensures that the arbiters do not reach a deadlock or a contention case when attempting to grant access to a shared resource. Moreover, use of different clock signal portions enables reliable arbitration with minimal logic.

Another aspect of the present invention provides a method in a data controller for arbitrating access to at least one of a first and a second bus. The method includes dividing a clock signal into at least two exclusive portions, generating first and second signals indicating the availability of the first bus and the concurrent availability of the first and second buses, respectively, and granting access to an activity requiring access to the first bus during a first exclusive portion of the clock signal and based on the second signal. Access to the second bus is granted to a second activity requiring access to the first and second buses during a second exclusive portion of the clock signal and based on the availability of the second bus and the first signal. Use of exclusive portions in the clock signal enables the data controller to selectively grant access for a specific activity that may require access to one or more buses, even if multiple requests are received simultaneously.

Other objects and advantages of the present inventor will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings and description are to be regarded as illustrative in nature, and not as restrictive.

DETAILED DESCRIPTION OF ILLUSTRATED EMBODIMENTS

Figure 1:
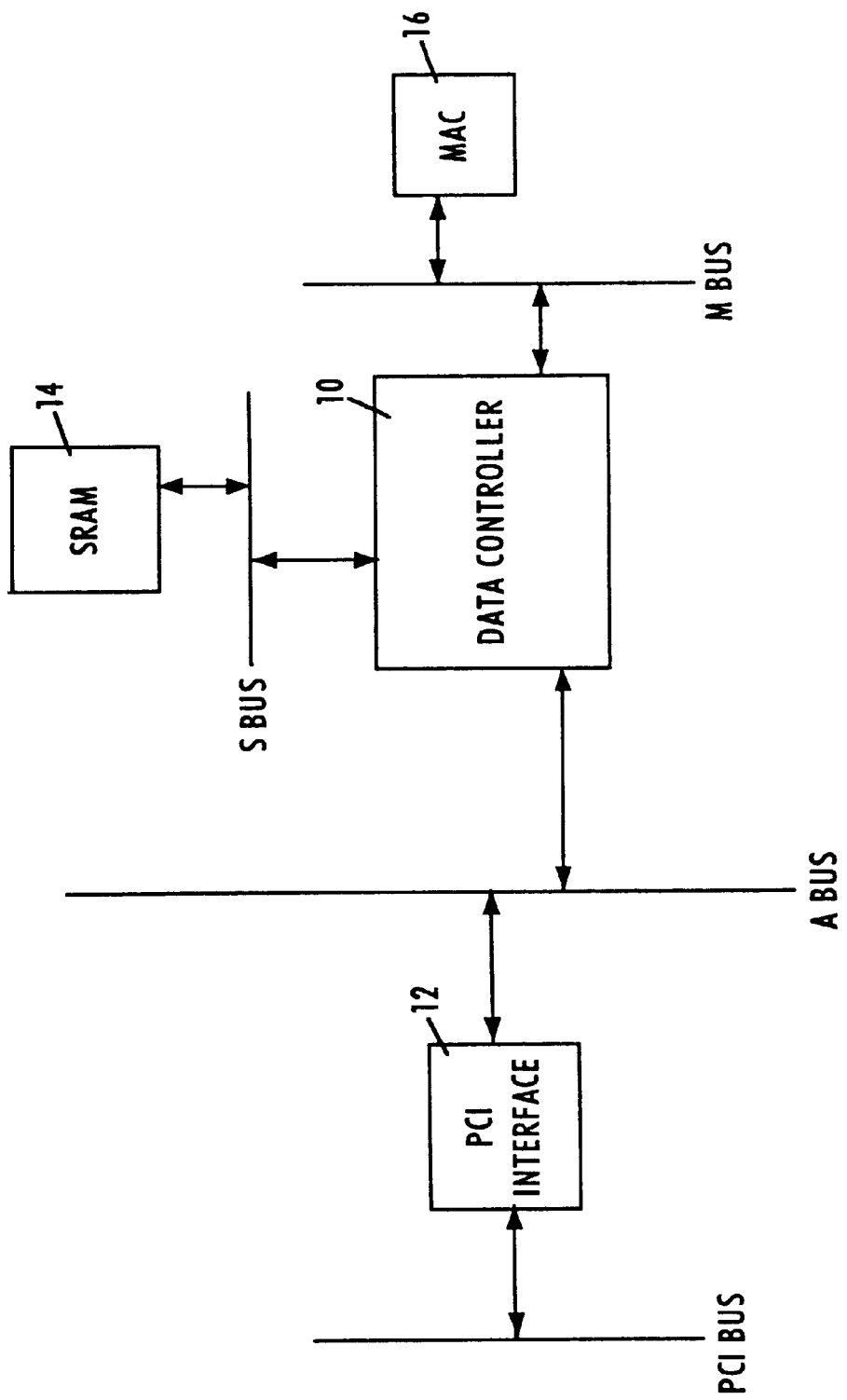
FIG. 1 is a block diagram of an arrangement for transferring data between a network interface and a host processor according to an embodiment of the present invention.

FIG. 1 is a block diagram of an exemplary system in a network station which uses the arbitration scheme of the invention. It will become apparent, however, that the present invention is also applicable to any other system which requires resource arbitration.

FIG. 1 includes a data controller 10 that controls data transfers between a network interface and a host controller in a network station. The system includes a peripheral component interconnect (PCI) interface 12 that supports communication between a PCI bus and data controller 10 via a first data bus, referred to as the "A bus". A media access control (MAC) network interface 16 transfers data between the data controller 10 via a second cata bus referred to as the "M bus". The MAC network interface 16 outputs data packets onto a network, for example an Ethernet (IEEE 802.3) network, carrying data supplied from the data controller 10. The system also includes an external memory 14, preferably implemented as a static RAM (SRAM), that transfers data between the data controller 10 via a data bus referred to as the "S bus". The external memory 14 provides for the temporary storage of data being transferred between the host controller and connected workstations via the network, and supplements internal buffers within the PCI interface 12 and the MAC 16.

Figure 2:
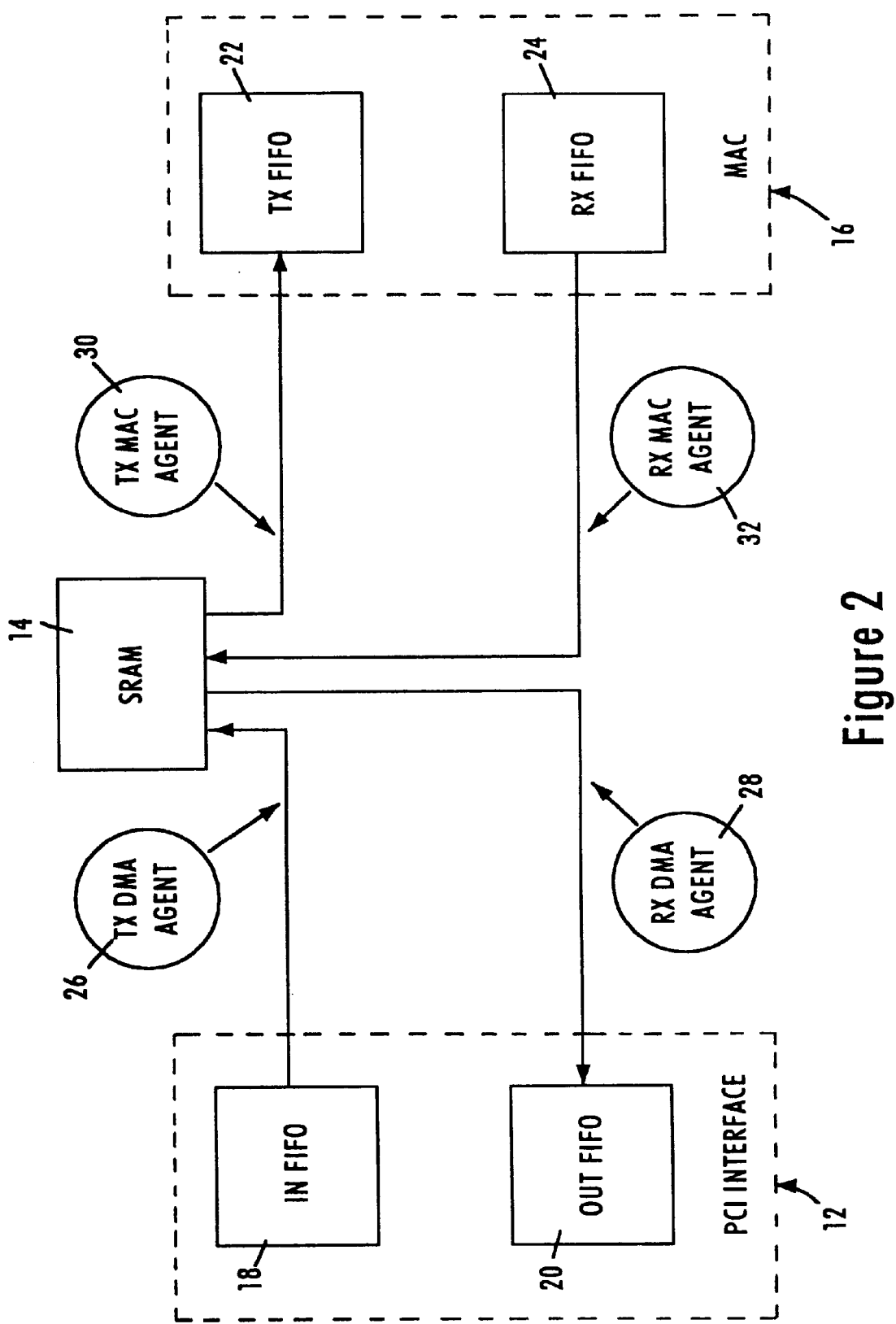
FIG. 2 is a block diagram illustrating data flow between the network interface and the PCI interface of FIG. 1.

FIG. 2 is a data flow diagram illustrating four agents executed by the data controller 10. The agents include a transmit direct memory access (Tx DMA) agent 26, receive direct memory access (Rx DMA) agent 28, transmit MAC (Tx MAC) agent 30 and receive MAC (Rx MAC) agent 32. The agents may be implemented, for example, as logic state machines. The agents 26 and 30 control the transfer of data (i.e., data flow) from the PCI interface 12 to the MAC 16 via SRAM 14 (i.e., the transmit data path), and the agents 28 and 32 control the transfer of data from the MAC 16 to the PCI interface 12 (i.e., the receive path). Hence, the transmit and receive data paths share SRAM 14. As described, the data controller 10 provides a mechanism for the four contending agents to access SRM 14.

The transmit DMA agent 26 coordinates all the activities for moving frames from the PCI interface 12 to the SRAM 14. These activities include descriptor read, data transfer from PCI bus to SRAM 14, status writes, and all the initialization needed by the above DMA activities.

The Tx DMA agent 26 moves frames from the PCI interface input FIFO 18 to SRAM 14 via the A bus and the S bus. When a complete transmit frame is received in SRAM 14, the Tx MAC agent 30 moves data to the MAC transmit FIFO 22 via the S bus. Specifically, when the transmit MAC agent 30 detects a ready condition of MAC transmit FIFO 22, transmit MAC agent 30 checks for a complete transmit frame in SRAM 14, and asserts a request signal to an arbiter, described below. Alternatively, the transmit MAC agent 30 may check if the transmit FIFO storage capacity reaches a prescribed threshold. After receiving a grant signal from the arbiter, the transmit MAC agent 30 calls a low level module to perform a data transfer of up to eight words to the MAC transmit FIFO 22.

The receive MAC agent 32 moves frames from MAC receive FIFO 24 to the SRAM 14 via the S bus. The SRAM 14 includes a queue scheme configured to hold as much as 64 frames without causing a receive overflow. A 64×32 bit long queue holds the frame length and receive status information for each normal frame received from MAC 16. The receive MAC agent 32 first checks to see if any exceptional condition exists which may cause a receive frame discard and a receive FIFO flush. If there is such a condition, the receive MAC agent 32 flushes the SRAM 14. When data is available from the receive FIFO 24, the receive MAC agent 32 sends a request to the arbiter and waits for the grant. The receive MAC agent 32 subsequently calls a low level module to perform a transfer of up to eight words from MAC receive FIFO 24 to the SRAM 14.

The receive DMA agent 28 coordinates all the activities for moving frames from SRAM 14 to the PCI bus. These activities include descriptor read, data transfer from SRAM 14 to PCI bus, status writes, and all the initialization needed by the above DMA activities.

All the DMA activities involve execution of the following steps by the corresponding DMA agent 26 or 28:

Send a request signal to an arbiter (not shown) and wait for grant signal from the arbiter.

In case of descriptor read, call a low level module to move the descriptor from the PCI bus to internal descriptor holding registers.

In case of data read, call a low level module to move eight words from the PCI bus to the SRAM 14.

In case of data write, call a low level module to move eight words from the SRAM 14 to the PCI bus.

In case of status write, call a low level module to move the status from an internal status holding register to the PCI bus.

De-assert the request signal to the arbiter.

A descriptor controller is included in data controller 10. The descriptor controller activities include receive status write (Rx Stat Wr), transmit status write (Tx Stat Wr), receive descriptor read (Rx Desc Rd) and transmit descriptor read (Tx Desc Rd). A slave controller is also included in data controller 10 and activities of the slave controller include slave read/write (Slv RW). All of these activities of the descriptor controller and slave controller require access to the A bus.

Figure 3:
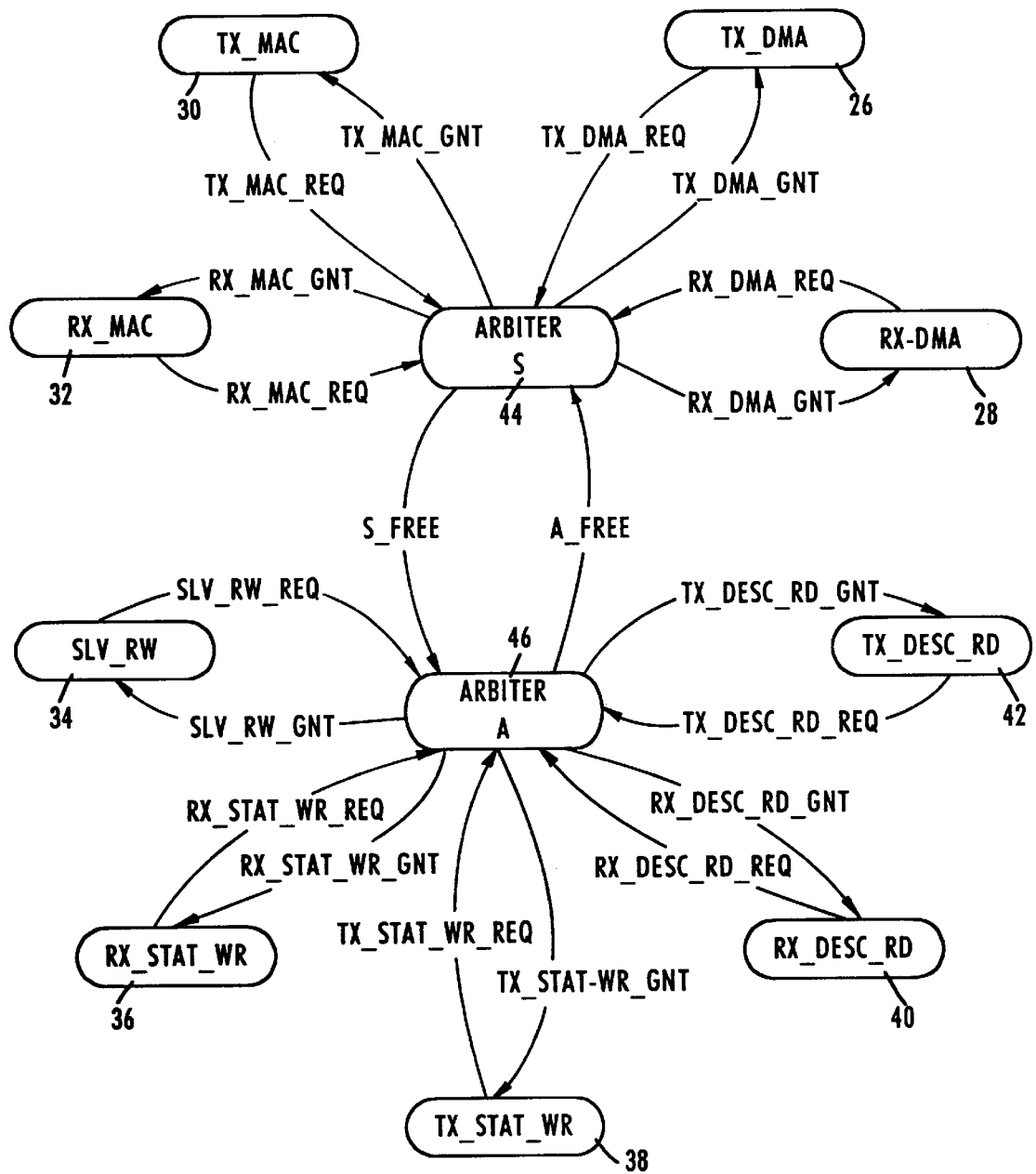
FIG. 3 is a block diagram illustrating the data controller of FIG. 1.

FIG. 3 is a block diagram illustrating the data controller 10 according to an embodiment of the present invention. As described above, the data controller 10 includes executable agents for performing specified operations. As described above, a first group of agents (26, 28, 30 and 32) share access to the SRAM 14, and hence must share access to the S bus. DMA agents 26 and 28 also require concurrent (i.e., simultaneous) access to both the A bus and the S bus for transfers between the PCI interface 12 and the SRAM 14. A second group of agents (Slv RW 34, Rx Stat Wr 36, Tx Stat Wr 38, Rx Desc Rd 40 and Tx Desc Rd 42) share access to the A bus. Since the agents in each group are not sequentially scheduled, the data controller 10 includes arbiter S 44 and arbiter A 46 that control access for bus S and bus A, respectively. The arbiters 44 and 46 perform arbitration using request (REQ) and grant (GNT) hand-shaking signals, a bus free signal, and a clock signal.

For example, transmit MAC request (TX MAC REQ) is a request generated by transmit MAC agent 30 to arbiter S 44 for access to S bus. Arbiter S 44 receives this request and grants access to the transmit MAC agent 30 by sending a transmit MAC grant (TX MAC GNT) signal to the transmit MAC agent 30. Similarly, the other access requests to arbiters S 44 and A 46, respectively, are performed in the same manner. Only one agent can be granted access to a shared resource (e.g., the A bus) at any given time.

As described above, transmit DMA 26 and receive DMA 28, transfer data between the PCI bus and SRAM 14, requiring access to the A bus and the S bus simultaneously. In order to ensure that the A bus and S bus are both available when these two agents require access, arbiter A 46 and arbiter S 44 communicate the status of their respective buses with signals A FREE and S FREE.

Arbiter A 46 generates and sends signal A FREE to arbiter S 44 when A bus is available. Similarly, arbiter S 44 generates and sends S FREE to arbiter A 46. Signal S FREE is normally asserted, but is de-asserted when arbiter S 44 intends to give a grant to either transmit DMA agent 26 or receive DMA agent 28 for accessing both the S bus and the A bus. Hence, S FREE is deasserted only when both the S bus and A bus are unavailable. Signal A FREE is normally asserted, but is de-asserted when arbiter A 46 intends to give a grant to any one of the agents in the second group. A grant will not be given to transmit DMA agent 26 or receive DMA agent 28 by arbiter S 44 unless A FREE is asserted, due to the fact that these two agents require access to the A bus as well as the S bus. Similarly, a grant will not be given to one of the agents in the second group by arbiter A 46 unless S FREE is asserted.

Figure 4:
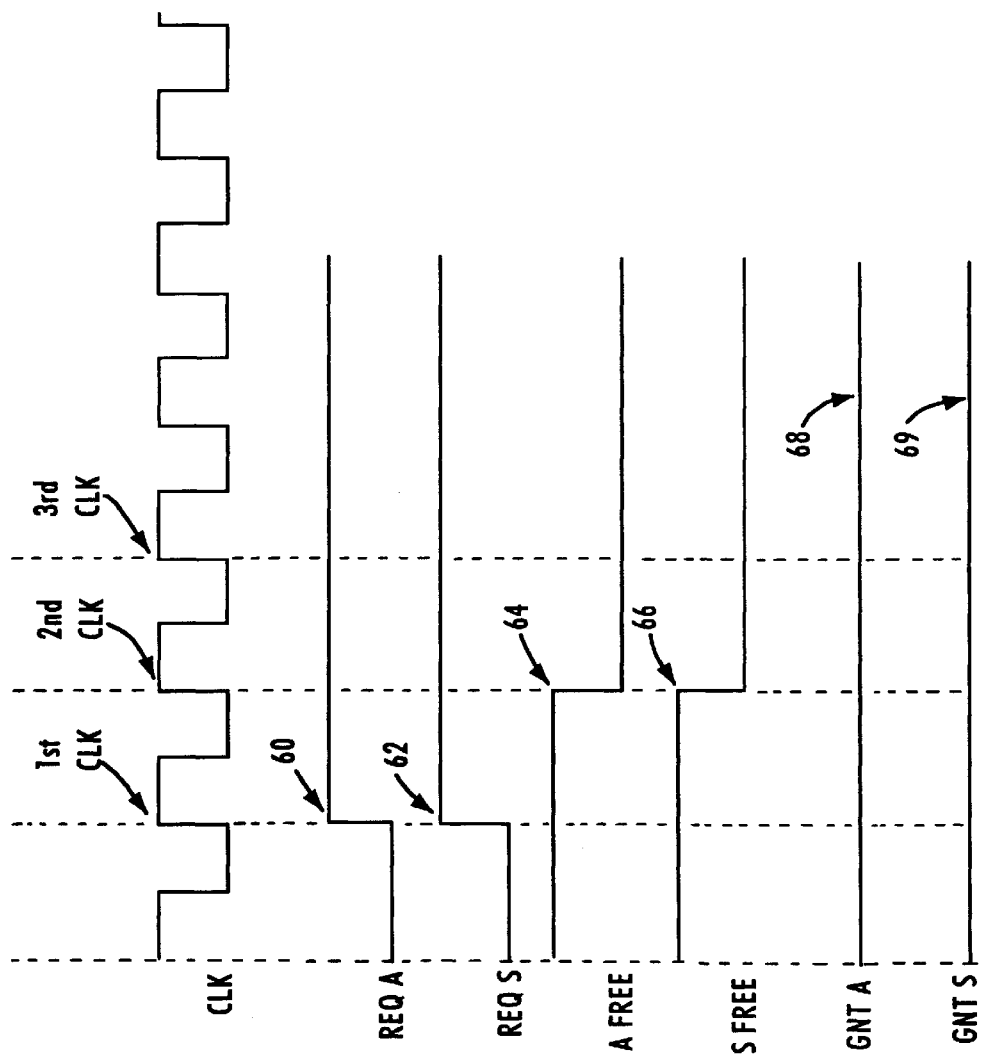
FIG. 4 is a timing diagram illustrating a deadlock case when the arbitration arrangement of the present invention is not used.

FIG. 4 illustrates a potential problem that may occur in the arbitration scheme of FIG. 3 when the arbitration arrangement of the present invention is not used. In FIG. 4, REQ S represents a request generated by transmit DMA agent 26 or receive DMA agent 28 requiring access to the S and A buses, and REQ A represents a request generated by one of the agents from the second group (e.g., agents 34, 36, 38, 40 or 42) requiring access to the A bus. GNT S represents only one grant to either transmit DMA agent 26 or receive DMA agent 28, while GNT A represents only one grant to one of the agents from the second group.

In response to the assertion of REQ S at event 62, arbiter S 44 deasserts S FREE at event 66 to inform arbiter A 46 at the second clock that S bus is no longer available. At the third clock, GNT S is asserted if A FREE is asserted. Arbiter A 46 operates the same way at the same time upon REQ A. That is, arbiter A 46 responds to REQ A at event 60 by de-asserting A FREE at event 64 to inform arbiter S 44 at the second clock that S bus and A bus are no longer available. At the third clock, GNT A is asserted if S FREE is asserted. In this example, a deadlock occurs at the third clock cycle because each arbiter, 44 and 46, thinks that the shared A bus is busy and neither of the grant signals are asserted at events 68 and 69. Thus, the agent requesting access to the A bus is denied access and the agent requesting access to the S bus is also denied access.

Figure 5:
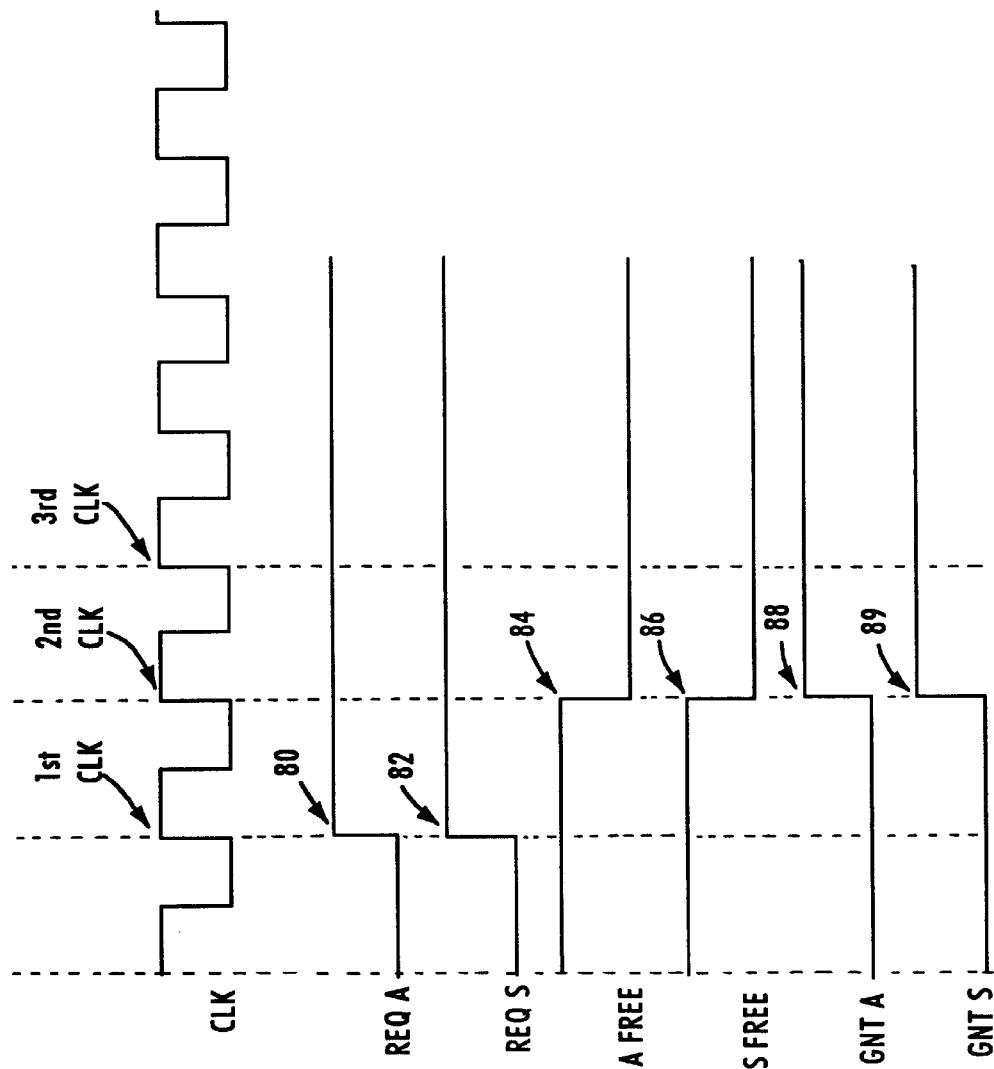
FIG. 5 is an alternative timing diagram illustrating a contention case when the arbitration arrangement of the present invention is not used.

FIG. 5 illustrates another potential problem that may occur in the arbitration scheme of FIG. 3 when the arbitration arrangement of the present invention is not used. In FIG. 5, in response to assertion of REQ S at event 82, arbiter S 44 informs arbiter A 46 that S bus and A bus are not available at the second clock by de-asserting S FREE at event 86 and asserting GNT S at event 89 to grant access to S bus and A bus. Arbiter A 46 responds to REQ A at event 80 by informing arbiter S 44 that A bus is not available at the second clock by de-asserting A FREE at event 84 and asserting GNT A at event 88 to grant access to A bus. A contention thus occurs at the second clock for the shared A bus because both GNT A and GNT S are asserted at events 88 and 89, causing the two requesting agents to access the same A bus at the same time. This is due to the fact that GNT S results in either transmit DMA agent 26 or receive DMA agent 28 accessing the S bus and the A bus at the same time an agent from the second group is accessing the A bus.

In order to resolve the above contention/deadlock problem, a time multiplexed arbitration scheme is used.

Figure 6:
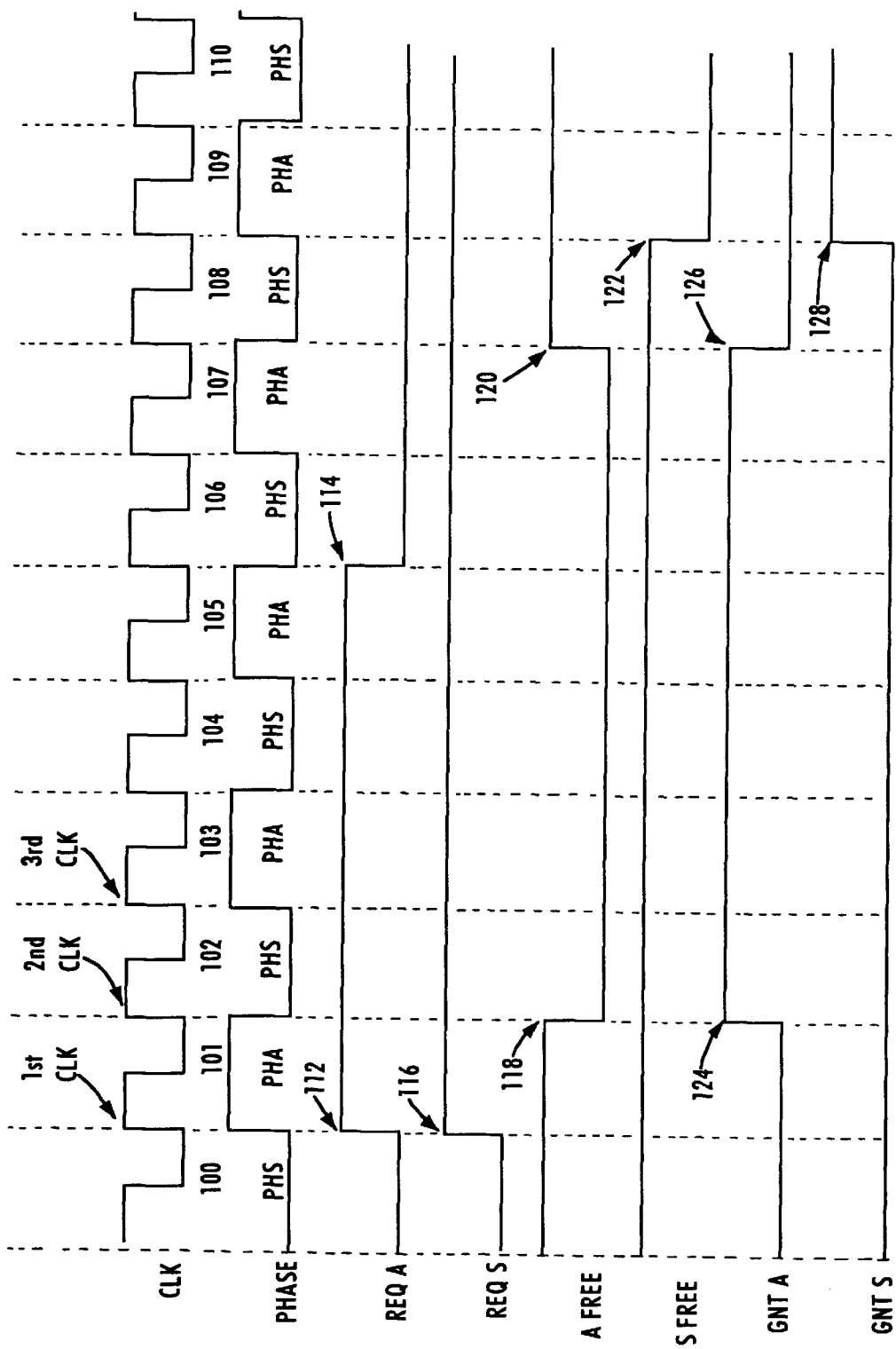
FIG. 6 is a timing diagram illustrating a time multiplexed arbitration scheme for the system of FIG. 1.
Figure 7:
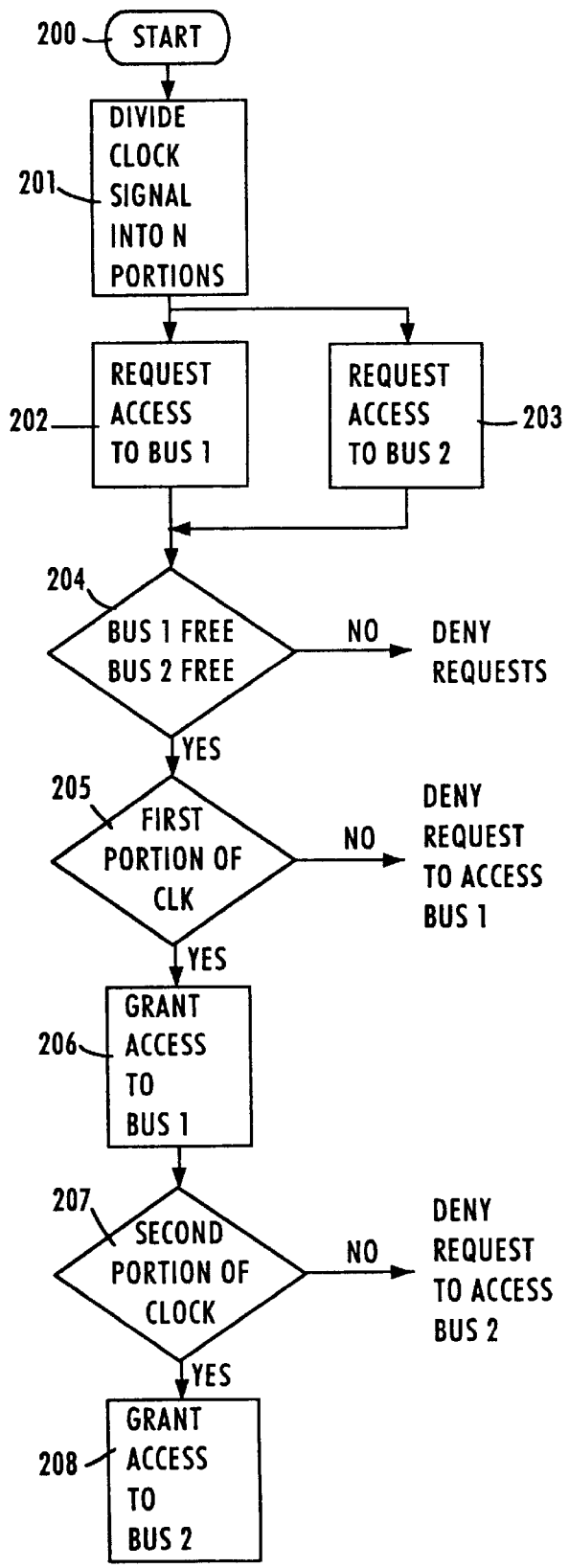
FIG. 7 is a flow diagram of the method for arbitrating access according to an embodiment of the present invention.

FIG. 7 is a flow diagram illustrating the method for arbitrating access according to an embodiment of the present invention. The disclosed method may be implemented in parallel (e.g., as a state machine). The method begins in step 201 by dividing the clock into N portions, where N corresponds to the number of arbiters contending for a shared resource, in this case the A bus. In this case, N=2 for arbiters 44 and 46. With reference to FIG. 6, the data controller 10 generates a PHASE signal as a divided-by-two clock derived from the system clock, CLK. The high phase at 101, 103, 105, 107 and 109 (PHA) is reserved as a first exclusive portion of the system clock signal for arbiter A 46 while the low phase at 100, 102, 104, 106, 108 and 110 (PHS) is reserved as a second exclusive portion for arbiter S 44. The system clock, CLK, in the exemplary system is a 33 MHz crystal reference clock. However, any known reference signal providing a stable clock signal may be used. In addition, the details of generating a divided by two clock derived from a reference clock are not needed for the present invention. Any typical device known in the art to receive an input clock signal and generate a new clock signal which is a divided by two version of the reference clock is suitable for use in the invention.

In the time multiplexed arbitration scheme of the present invention, arbiter A 46 de-asserts A FREE and asserts GNT A only during the corresponding exclusive portion PHA in response to REQ A in step 202 and arbiter S 44 de-asserts S FREE and asserts GNT S only during the corresponding exclusive portion PHS in response to REQ S in step 203.

However, both S FREE and A FREE must be asserted (i.e., A bus must be free) for either request to be granted regardless of which phase the clock is in. Since arbiter A 46 and arbiter S 44 never make a decision at the same phase, the deadlock and contention cases are avoided.

With reference to FIG. 6, upon the assertion of REQ A at event 112, both signals A FREE and S FREE are asserted. Therefore, arbiter A 46 checks in step 204 if both S FREE and A FREE are asserted, and asserts GNT A at event 124 during the exclusive portion PHA in steps 205 and 206 and de-asserts A FREE at event 118. Therefore, access to A bus is granted to an agent in the second group (e.g., agent 34, 36, 38, 40, or 42) requesting access to the A bus. During this time, arbiter S denies requests in step 204. When REQ A is de-asserted at event 114, A FREE is re-asserted at event 120. In response to REQ S, S FREE and A FREE being asserted at cycle 107, the arbiter S asserts GNT S at PHS at event 128 in steps 207 and 208 and de-asserts S FREE at event 122. Therefore, access to the S bus and A bus is granted to either transmit DMA agent 26 or receive DMA agent 28. Since arbiter S 44 and arbiter A 46 never de-asserts A FREE and S FREE during the same phase, requests for the system resources avoid both deadlock and contention problems.

The time multiplexed arbitration system described in the exemplary embodiment uses two arbiters and divides the clock signal into two phases, one for each arbiter. However, the multiplexed arbitration system is equally applicable to systems which include more than two arbiters. For example, a system may utilize three arbiters for arbitrating access to three separate buses. In such a system, if one of the activities requires access to each of the three buses, or more than one of the activities requires access to more than one of the buses, the clock signal is divided into three phases, one phase for each arbiter. In this manner, the first phase is utilized for granting access to the first activity, the second phase for the second activity and the third phase for the third activity. Similarly, for situations with four arbiters, the clock is divided into four phases.

The exemplary embodiment of the time multiplexed arbitration system also assumes that the clock phases are of equal duration. Alternatively, the invention may assign different portions of the clock cycle, or time slices, to different arbiters. For example, if it is known that a first activity occurs more frequently than a second activity, the first portion of the clock cycle may be longer in duration than a second portion of the clock cycle. In this manner, the request from a first activity is more likely to be granted at any given time since the period of time that the first arbiter may grant the request is longer than the period of time that the second arbiter may grant the request.

The exemplary embodiment of the invention also shows the buses being located external to the chip. Alternatively, the invention is usable in a system in which the buses are internal buses within the chip. In addition, the disclosed arrangement is applicable to systems using multiple arbiters sharing multiple buses. Hence, different variations of arbiters and buses may be used.

Described has been a system and method for time multiplexer arbitration that avoids deadlock and contention. An advantage of the invention is that the arbitration scheme enables the system to process data transfers in a timely manner without requiring complex arbitration algorithms to determine how to transfer the data. Another advantage of the invention, is that the arbitration scheme used does not require a hierarchy of arbiters to resolve resource contention. This saves processing time and enables the arbiters to save chip space by eliminating complex logic.

In this disclosure, there is shown and described only the preferred embodiments of the invention, but, as aforementioned, it to be understood that the invention is capable of use in various other combinations and environments and is capable of changes or modifications within the scope of the inventive concept as expressed herein.

What is claimed is:

1. An arbitration system comprising:
    a first arbiter configured for granting, to a first requesting agent, access to a first bus during a first portion of a clock signal and based on an availability of a second bus; and
    a second arbiter configured for granting, to a second requesting agent, access to the second bus during a second portion of the clock signal and based on an availability of the second bus, the first requesting agent requiring concurrent access to the first and second buses.

2. The arbitration system of claim 1, wherein the first arbiter is configured for sending a first bus free signal to the second arbiter indicating a concurrent availability of the first bus and the second bus.

3. The arbitration system of claim 2, wherein the second arbiter is configured for sending a second bus free signal to the first arbiter indicating an availability of the second bus.

4. The arbitration system of claim 2, wherein the first arbiter is configured for granting said access to the first bus to the first requesting agent only when the first bus and second bus are both free, the first requesting agent transferring data on said first bus and said second bus in response to the granting of said access to the first bus.

5. The arbitration system of claim 2, wherein the second arbiter is configured for granting said access to the second bus to the second requesting agent based on said first bus free signal, the second requesting agent transferring data on said second bus in response to the granting of said access to the second bus.

6. The arbitration system of claim 5, wherein the first requesting agent transfers said data between a PCI interface coupled to the first bus and a storage device coupled to the second bus.

7. A method in a data controller of arbitrating access to at least one of a first bus and a second bus, the method comprising the steps of:
    a) dividing a clock signal into at least two exclusive portions;
    b) generating first and second signals indicating availability of the first bus and the concurrent availability of the first and second buses, respectively;
    c) granting first bus access to a first activity requiring access to the first bus during a first exclusive portion of the clock signal and based on the second signal; and
    d) granting second bus access to a second activity requiring access to the first and second buses during a second exclusive portion of the clock signal and based on the availability of the second bus and the first signal.

8. The method of claim 7, wherein step c) further comprises:
    granting said first bus access to the first activity only when the first bus is free.

9. The method of claim 7, wherein step d) further comprises:
    granting said second bus access to the second activity only when the second bus and the first bus are both free.

10. An arbitration system for providing access arbitration among a plurality of activities, the system comprising:
    a clock signal having exclusive portions;
    first and second buses, wherein the activities require access to at least one of the buses and one of the activities requires concurrent access to the first and second buses; and
    an arbiter configured for selectively granting access to the activities for the corresponding required buses, wherein each activity is granted access to the required buses during a different one of the exclusive portions of the clock signal.

11. The arbitration system of claim 10, wherein the arbiter comprises
    first and second bus arbiters for granting access to the first and second buses during first and second of said exclusive portions, respectively.

12. The arbitration system of claim 11, wherein the first bus arbiter is configured for sending a first bus free signal to the second bus arbiter indicating an availability of the at least two buses concurrently.

13. The arbitration system of claim 12, wherein the first bus arbiter is configured for granting bus access to the one activity based on a second bus free signal generated by the second bus arbiter indicating an availability of the second bus.

14. An arbitration system comprising:
    a first device;
    a memory device coupled to the first device by a first bus;
    a second device coupled to the first device by a second bus;
    a first arbiter configured for granting, to a first requesting agent, access to the memory device via the first bus and the second bus during a first phase of a clock signal and based on an availability of the second bus; and
    a second arbiter configured for granting, to a second requesting agent, access to the second bus during a second phase of the clock signal and based on an availability of the first bus.

15. The arbitration system of claim 14, wherein the second arbiter is configured for sending a bus free signal to the first arbiter indicating an availability of the second bus and the first arbiter is configured for sending a bus free signal to the second arbiter indicating a concurrent availability of the first and second bus.

* * * * *